April 21, 1931.  E. L. BUCHANAN  1,801,951

ARTIFICIAL BAIT OR LURE

Filed March 3, 1930

INVENTOR
Ernest L. Buchanan
BY Chappell & Earl
ATTORNEYS

Patented Apr. 21, 1931

1,801,951

UNITED STATES PATENT OFFICE

ERNEST L. BUCHANAN, OF KALAMAZOO, MICHIGAN, ASSIGNOR TO SHAKESPEARE COMPANY, OF KALAMAZOO, MICHIGAN

ARTIFICIAL BAIT OR LURE

Application filed March 3, 1930. Serial No. 432,784.

The main object of this invention is to provide in an artificial bait or lure an improved hook attaching means in which it is practically impossible for the hook to "foul" or become "hung up", at the same time the hook has a very free movement and is effectively supported to receive the strike of the fish.

A further object is to provide in an artificial bait or lure a hook attaching means which also provides means for the attachment of a supplemental bait or lure such as a piece of pork rind.

Objects relating to details and economies of my invention will appear from the description to follow. The invention is defined and pointed out in the claims.

A structure which is a preferred embodiment of my invention is illustrated in the accompanying drawing, in which.

Figure 1:
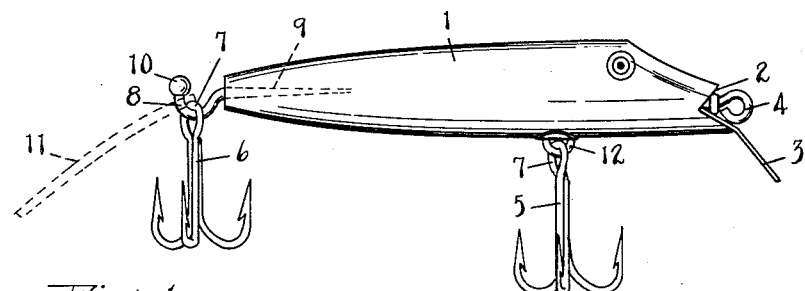
Fig. 1 is a side elevation of an artificial bait or lure embodying the features of my invention, a piece of pork rind being indicated by dotted lines.
Figure 2:
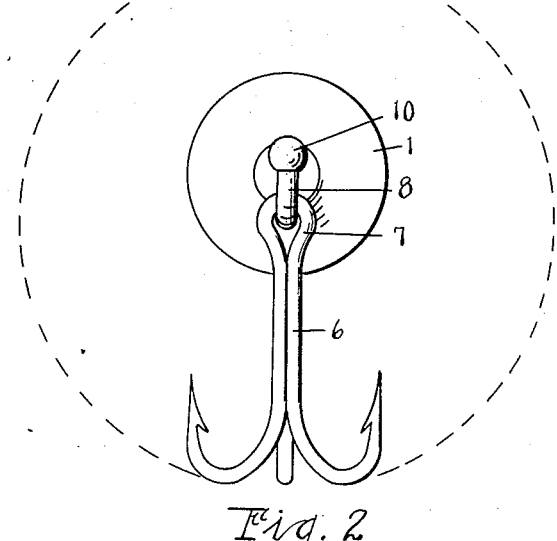
Fig. 2 is a rear end view.
Figure 3:
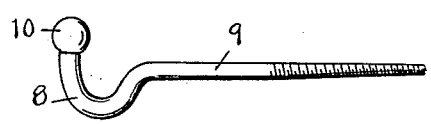
Fig. 3 is a side elevation of the hook attaching member.

Referring to the drawing, the body 1 is of the swimming type having a notch 2 at its forward end to the lower wall of which I secure the blade or fin 3 to project downwardly from the body of the bait. The line attaching eye 4 is secured at the bottom of the notch or recess.

The structure illustrated is provided with a bottom hook 5 and a tail hook 6, these hooks illustrated being treble hooks and having eyes 7 at the ends of their shanks.

The tail hook 6 is attached to the body by means of an upwardly facing U-shaped attaching member 8 having a shank 9 projecting laterally from its inner end and threaded longitudinally into the rear end of the bait. The outer arm of the attaching member terminates in a spherical head 10.

The eye of the tail hook is loosely engaged with this U-shaped attaching member so that it is free to swing thereon, both longitudinally of the attaching member and also to rotate on the attaching member.

The outer arm of the attaching member preferably projects substantially above the inner arm, allowing the hook to swing to substantial alignment with the axial center of the body.

If desired, a piece of pork rind or other lure or bait, as indicated at 11, may be engaged over the head 10, the attaching member providing an effective means for attaching the supplemental bait or lure and supporting it in proper relation to the hook.

In the embodiment illustrated, the bottom hook is attached by means of a staple-like attaching member 12. However, the attaching members 8 may be employed for attaching the bottom hooks also. It is, however, particularly desirable for use in attaching the tail hook.

In my improved baits or lures, the hooks cannot "foul" or "hang up" as quite commonly occurs where the hooks are attached as by means of screw eyes as is common practice. The hook has a free movement which is desirable in properly presenting the hook to receive the strike of the fish.

I have not attempted to illustrate or describe certain other embodiments and adaptations of my improvements as it is believed that this disclosure will enable those skilled in the art to embody or adapt my improvements as may be desired.

Having thus described my invention, what I claim as new and desire to secure by Letters Patent, is:

1. A fish bait or lure comprising a body, a hook having an eye at the end of its shank, and an upwardly facing U-shaped hook attaching member loosely engaging the eye of the hook and having a shank projecting laterally from its inner arm threaded longitudinally into the rear end of the body and a spherical head on the end of the U-shaped attaching member to prevent disengagement of the hook.

2. A fish bait or lure comprising a body, a hook having an eye at the end of its shank, and an upwardly facing U-shaped hook attaching member loosely engaging the eye of the hook attached by one arm to the rear end of the body and a head on the end of the U- shaped attaching member to prevent disengagement of the hook.

3. A fish bait or lure comprising a body, a hook provided with an eye, and a U-shaped attaching member with which the eye of the hook is loosely engaged, one arm of the attaching member being connected to said body. and a head on the end of the U-shaped attaching member to prevent disengagement of the hook.

4. A fish bait or lure comprising a body, a hook having an eye at the end of its shank, and a fastener member threaded into said body and having a U-shaped bend at its outer end with which the eye of the hook is loosely engaged and a spherical head on the end of the U-shaped attaching member to prevent disengagement of the hook.

5. A fish bait or lure comprising a body, a hook provided with an eye, and a U-shaped attaching member, one arm of which is connected to said body so that the attaching member projects therefrom, and a head on the end of the U-shaped attaching member to prevent disengagement of the hook, the eye of said hook being loosely engaged with said attaching member.

In witness whereof I have hereunto set my hand.

ERNEST L. BUCHANAN.